United States Patent [19]

Gardner et al.

[11] E Patent Number: Re. 32,939

[45] Reissued Date of Patent: Jun. 6, 1989

[54] MEDICAL APPLIANCE

[75] Inventors: Arthur M. N. Gardner; Roger H. Fox, both of Devon, England

[73] Assignee: Electro-Biology, Inc., Parsippany, N.J.

[21] Appl. No.: 194,438

[22] Filed: May 16, 1988

Related U.S. Patent Documents

Reissue of:

[64] Patent No.: 4,614,180
Issued: Sep. 30, 1986
Appl. No.: 763,686
Filed: Aug. 8, 1985

U.S. Applications:

[63] Continuation-in-part of Ser. No. 621,499, Jun. 18, 1984, abandoned.

[30] Foreign Application Priority Data

Jun. 22, 1983 [GB] United Kingdom ..... 8316959
Nov. 11, 1983 [GB] United Kingdom ..... 8330138

[51] Int. Cl.[4] ..... A61H 7/00

[52] U.S. Cl. ..... 128/64; 128/25 B; 128/40

[58] Field of Search ..... 128/64, 25 B, 24 R, 128/38–40, 581, 582, 166.5, 382, 383, DIG. 20

[56] References Cited

U.S. PATENT DOCUMENTS 1,492,514 4/1924 Jensen ..... 128/166.5
2,880,721 4/1959 Corcoran ..... 128/64
3,171,410 3/1965 Towle, Jr. et al. ..... 128/DIG. 20
3,908,642 9/1975 Vinmont ..... 128/40

FOREIGN PATENT DOCUMENTS 2390156 1/1979 France ..... 128/24 R

OTHER PUBLICATIONS

"The Venous Pump of the Human Root–Preliminary Report"; *Bristol, Medico-Chirugical Journal,* Gardner and Fox, pp. 109–112; Jul. 1983.

*Primary Examiner*—Edgar S. Burr
*Assistant Examiner*—Huong Q. Pham
*Attorney, Agent, or Firm*—Hopgood, Calimafde, Kalil, Blaustein & Judlowe

[57] ABSTRACT

The invention contemplates a non-invasive technique and apparatus for artificially stimulating the venous-return flow of blood from the foot by inducing sharply pulsed squeezing or necking-down of the vessels of the venous-pump mechanism within the foot. The stimulation results from transient flattening of the plantar arch, in that an induced transient spread of the heel with respect to the ball of the foot stretches, and therefore necksdown involved blood vessels; stimulation also results from such a squeeze of the plantar-arch region as to concurrently squeeze the involved blood vessels. Cyclically inflatable devices, local to the foot-pump region, are disclosed for inducing either or both of the indicated actions.

28 Claims, 4 Drawing Sheets

MEDICAL APPLIANCE

Matter enclosed in heavy brackets [ ] appears in the original patent but forms no part of this reissue specification; matter printed in italics indicates the additions made by reissue.

BACKGROUND OF THE INVENTION

This application is a continuation-in-part of copending application Ser. No. 621,499, filed June 18, 1984, now abandoned, *which claimed priority from United Kingdom application No. 8316959, filed June 22, 1983 and United Kingdom application No. 8330138, filed Nov. 11, 1983.*

The invention relates to a medical appliance, and particularly to a medical appliance for applying pressure to a part of a human body for the purpose of stimulating blood circulation.

Such medical appliances are known which comprise a double-walled sheath adapted to fit over a limb, for example an arm or a lower leg portion, to be treated, and a pump apparatus arranged to inflate and deflate the sheath cyclically thereby to apply a pumping action to the limb and thus assist venous blood-flow therein.

A particular disadvantage of such known appliances is that they cannot be used when the limb to be treated is also to be encased in a plaster cast, or sometimes when the limb has been subjected to surgery; neither is it possible, with any appliance which completely encloses the extremity, for the physician to use the pin-prick test for nerve response at the involved extremity, nor can he carry out the essential tests to assess the state of circulation at the extremity.

A further disadvantage of known appliances is that they are not suited to continuous use by the patient.

These disadvantages are particularly significant in relation to appliances for use on feet and legs where as is known stimulation of blood flow is desirable when the limb cannot be used for walking.

We have discovered a venous pump mechanism in the sole of the human foot, which under normal walking conditions for the foot, serves to return blood from the leg into the abdomen with no assistance from muscular action.

BRIEF STATEMENT OF THE INVENTION

According to one aspect of this invention, there is provided a medical appliance comprising an active device for engagement, in use, with at least the sole of a human foot, said device being operative, in use of the appliance, to apply pressure cyclically to said sole thereby to stimulate the venous pump mechanism in said foot.

Essentially, said active device includes means to render said device active when said foot is not in use for ambulation.

According to another aspect of this invention there is provided a medical appliance comprising an active device in the form of an inflatable bag shaped for engagement with at least the sole of a human foot; inflation means connected to the bag and capable of inflating the bag rapidly; means to deflate the bag; and means to secure the bag to a human foot such that when being inflated the bag applies pumping pressure to the sole of the foot.

DETAILED DESCRIPTION

Several medical appliances embodying this invention will now be described by way of example with reference to the drawings, in which.

Figure 1:
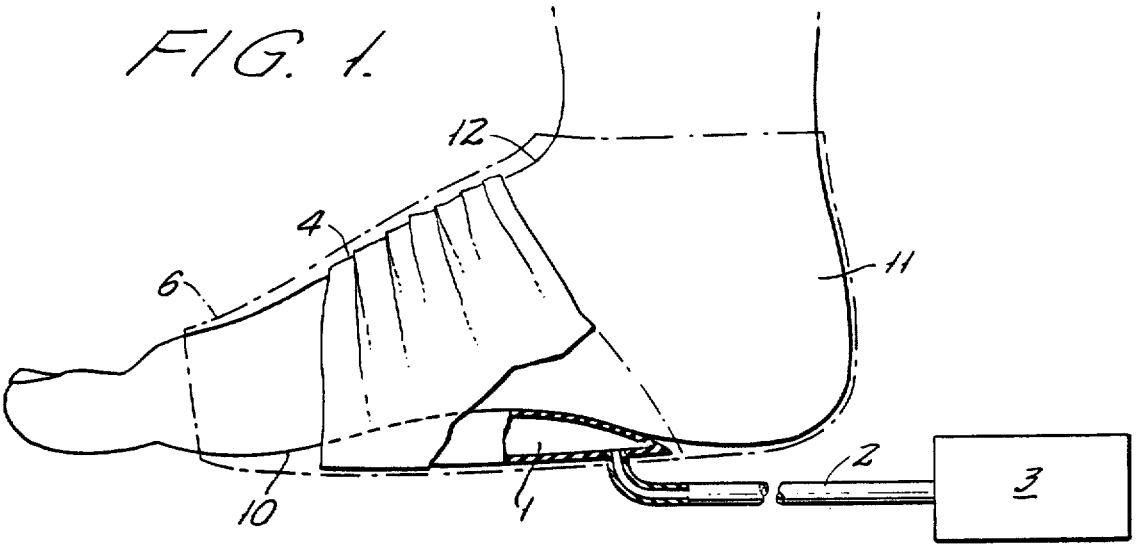
FIG. 1 is a view of a first appliance, partly broken away and in a position on a human foot.

Referring to FIG. 1, the appliance here shown comprises an inflatable bag or bladder 1 formed of plastics material and shaped for engagement with the sole 10 of a human foot 11 in the plantar arch thereof. The bag 1 is connected by way of a flexible pipe 2 to a pump apparatus 3 by which the bag 1 can be inflated.

The bag 1 may be secured to the foot 11 by a suitable slipper or by adhesive means, but in the form shown a cloth sling 4 embraces the bag 1 and is secured over the instep 12 of the foot 11, thus providing a circumferential tie at or around the midtarsal joint. Padding material can be located between the sling 4 and the instep 12 if necessary or desirable, and it is generally recommended that a porous knitted or other fabric such as stockinette be first applied to the foot so as to be interposed between the bag 1 and the foot, thus allowing for ventilation and preventing chafing of the skin.

The sling 4 and bag 1 are covered by a cloth slipper 6 which covers the majority of the foot 11.

In use of the appliance when secured to a foot as shown in FIG. 1, the pump apparatus 3 operates rapidly to inflate the bag 1 which then applies a pumping pressure to the sole 10 of the foot 11, and also urges the ball and heel of the foot away from each other, thus applying upward and spreading force and flattening the plantar arch as would occur if the foot 11 were placed on the ground (i.e., body-weight bearing) during normal ambulation, thereby stimulating venous blood-flow. Preferably, an accumulator tank is part of the pump apparatus 3, the same being continuously charged by the pump, and having the capacity for rapid inflation of bag 1. A valve arrangement (not shown) in the pump apparatus 3 then allows the bag 1 to deflate, whereafter the bag 1 is again inflated, the inflation/deflation cycle being repeated as long as treatment with the appliance is required.

Preferably inflation of the bag 1 is effected in two seconds or less to provide a satisfactory pumping action, while deflation of the bag 1 can take as long as is necessary for the return of blood to the veins of the foot 11.

The treatment thus provided simulates walking on the foot 11, and thereby improves venous blood circulation in a person being treated who would normally be unable to walk or possibly even stand on the foot.

As a modification of the above described appliance, the valve arrangement in pump apparatus 3 can be dispensed with, the pump apparatus serving only for cyclic inflation of the bag 1, and at least that surface of the bag 1 which is proximal to the foot 11 being formed with air leakage orifices thereby to the permeable to air, or being made of a microporous material which is inherently permeable to air. Such a surface can be provided as will give the required period for deflation of the bag 1, and, whether the leakage is via orifices or a permeable material, deflation necessarily commences immediately upon completion of single-pulse delivery of inflation air.

Such an appliance gives the advantages that the air leaving the permeable surface of the bag 1 serves to prevent accumulation of moisture between the bag 1 and the foot 11, thus enhancing the comfort of the user of the appliance and making skin problems less likely.

A particular advantage of the appliance of this invention is that it can be used when a foot is to be encased in a plaster cast, or when the leg carrying the foot 11 has been subjected to surgery.

Figure 2:
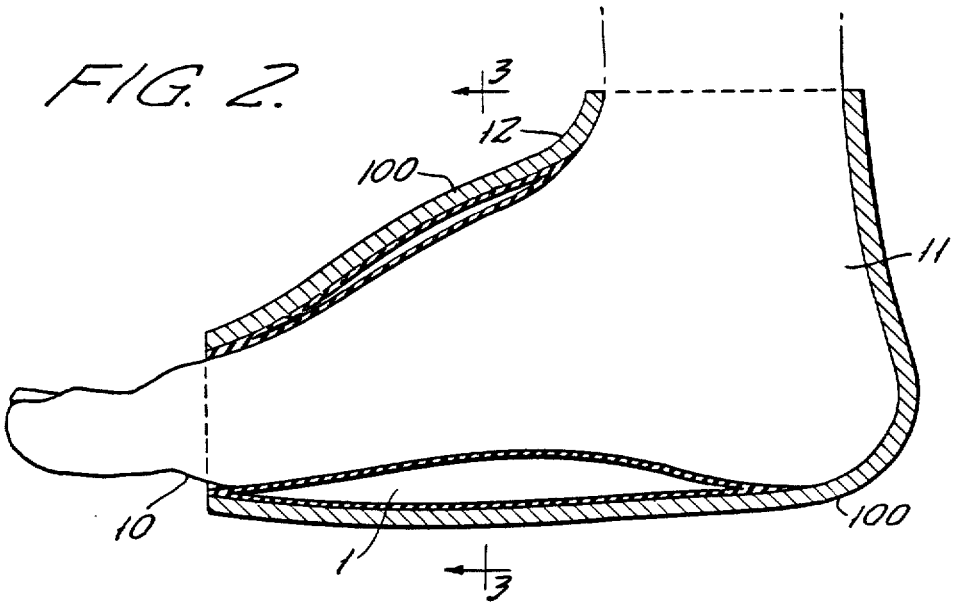
FIG. 2 is a view similar to FIG. 1, but showing a sectional view of a second appliance.
Figure 3:
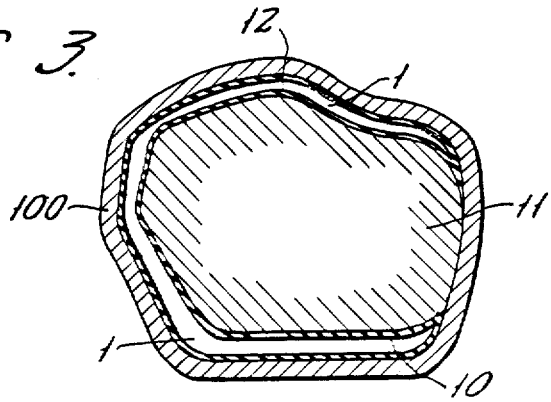
FIG. 3 is a sectional view on the line III—III in FIG. 2.

FIGS. 2 and 3 of the drawings show an appliance in position for use on a human foot 11 under a plaster cast 100, the same reference numerals as used in FIG. 1 being used for corresponding parts.

The appliance shown in FIGS. 2 and 3 is similar to that shown in FIG. 1, but is larger and extends not only under the sole 10 of the foot 11, but also around the inside of the foot 11 and over the instep 12 of the foot 11. As seen in FIGS. 2 and 3, the bag 1 has (1) a first active-surface portion which is longitudinally limited to the span between the ball and heel of the foot, and conformable to the sole of the foot within said span, and (2), as an integral formation with said first portion, a further portion of lesser longitudinal extent than said span and having inner lateral-aspect connection to said portion.

For use, the appliance is positioned on the foot 11 and the plaster cast 100 is then formed over the bag 1 as required, with the pipe 2 from the pump apparatus 3 passing either through a hole in the cast 100 or out of one end of the cast 100.

The bag 1 can be maintained in a partially inflated condition while the plaster cast 100 is formed, whereby allowance for subsequent possible swelling of the foot 11 is made.

Figure 4:
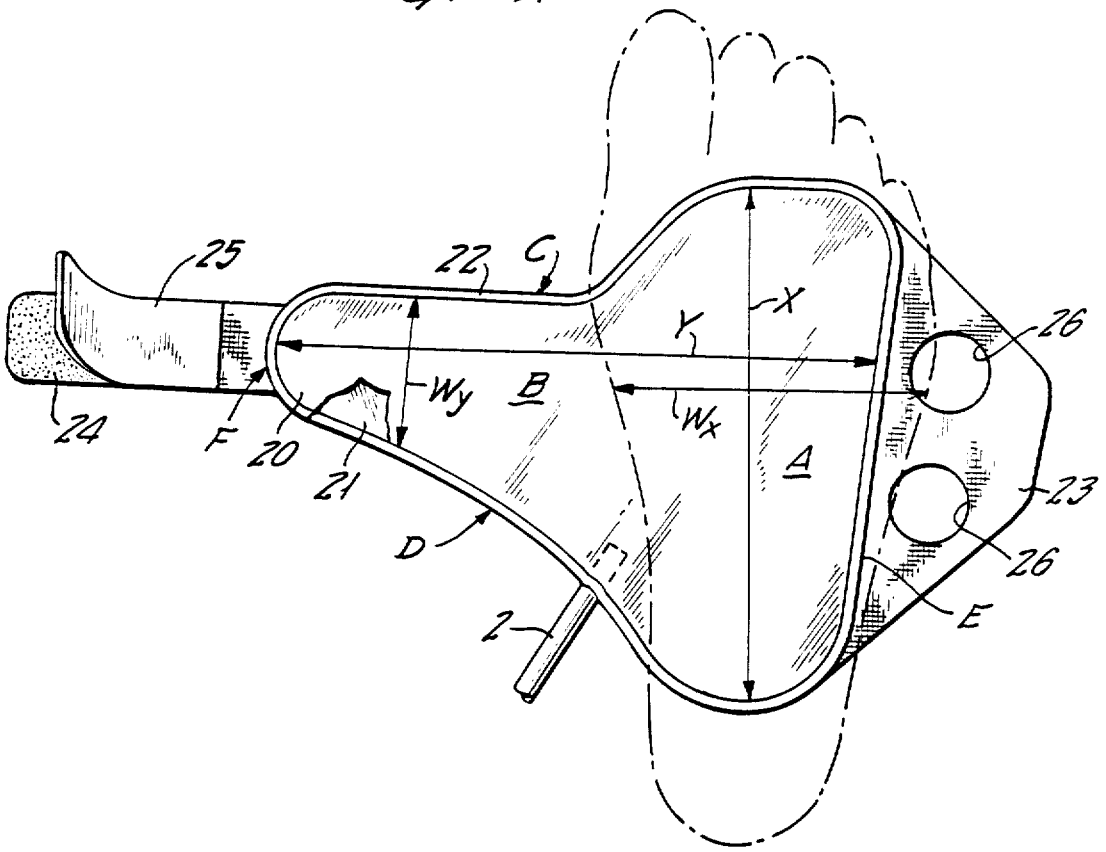
FIG. 4 is a partly broken-away plan view of the bag 1 as an article of manufacture, with a phantom superposed plan view of a right foot, positioned for wrapped application of the bag thereto.

More specifically, and referring to FIG. 4, the inflatable bag 1 may comprise two like panels 20–21 of flexible material, such as PVC or polyurethane film, peripherally sealed to each other as indicated at an edge seam 22. Each of the panels comprises a plantar-aspect sole area A configurated to longitudinally lap essentially only the region of the foot between adjacent plantar limits of the ball and heel of the foot and to extend into substantial register with lateral limits of the sole of the foot. The panels 20–21 also include, within the same peripheral seal or seam 22, an integrally formed dorsimedial area B which extends transversely from one edge of the sole area A to a transverse extent which is substantially as great as the longitudinal extent of the area A. Typically, as shown, for a foot requiring a shoe in the size range 9 to 12, the longitudinal extent X of the bag is about 7 inches, and the maximum transverse extent Y of the bag is about 8 inches. The average width $W_X$ of the sole area A is about 2.75 inches, and the reduced width $W_Y$ of the area B is about 2 inches. Along its anterior edge C, the area B is substantially straight and transverse to the longitudinal direction of area A, and along its posterior edge D, the area B tapers in a concave sweep from the heel end of area A to the narrow transverse end at width $W_Y$, the inlet pipe 2 having sealed entry approximately midway along the edge D.

What has been described for bag 1 in connection with FIG. 4 will in and of itself serve well as an article of manufacture, in that gauze, muslin, bandage material and/or adhesive tape may be relied upon to retain a circumferentially wrapped application to the bag to the foot. However, to facilitate such application without initial resort to such other instrumentalities. FIG. 4 additionally illustrates present preference for a flexible anchor tab 23 (as of vinyl sheet) which is integrally formed with bag 1, extending laterally beyond seam 22 at the longitudinal edge E of area A, and for a tie-down tab 24, also integrally formed with bag 1 beyond seam 22 at the transverse tip F of area B. A peel-off strip 25 of suitable release material is shown protecting a coating of pressure-sensitive adhesive on tab 24, so that upon adhesive exposure, tab 24 may be "tacked" to tab 23 in adjustably secured retention of the wrapped application of bag 1 to a foot. And it will be noted for the preferred relatively non-stretch nature of the material of tabs 23–24, a "tacked" circumferential completion of the wrap, involving a fastening of tab 24 in outer-end lap with tab 23, will enable circumferential hoop-tension force to be relatively uniformly distributed along substantially the entire longitudinal extent of area A, i.e., along edge E, thus assising in the plantar-arch flattening action described above. Plural apertures 26 in the larger tab 23 allow ventilation of adjacent skin but do not impair the indicated distribution of hoop-tension force.

Although FIG. 4 happens to show bag 1 for the situation in which the right foot is accommodated, it will be understood that the same accommodation to the left foot may also by made by the same article of manufacture. In application to the left foot, the plan view of FIG. 4 is reversed, from left to right, by placing the panel 20 on the bottom, beneath panel 21, and the pressure-sensitive adhesive is just as "tackable" to tab 23 as before, except for being engaged beneath tab 23.

As has already been noted, the release of pressure fluid after each pulsed delivery of inflation pressure is suitably via pores or apertures in one or both of panels 20–21. It may be found convenient to manufacture the bag 1 without such pores or apertures, using puncturable material. And the surgeon who makes the fitted application to a patient's foot need only first blow the bag via his mouth, then hold inlet 2 closed with a finger, while he uses a needle or other sharply pointed instrument to make plural punctures of the panel (20 or 21) which is to be adjacent the sole of the patient's foot; such puncturing may proceed while the surgeon squeezes the bag to satisfy himself that the desired degree of fluid leakage will be achieved in use. On the other hand, we prefer that bags 1 be marketed with existing perforations in each of two configurations, one specifically committed to right-foot application and the other specifically committed to left-foot application.

The described bag 1 of FIG. 4 will be seen, in cyclically pressurized use within the circumferential bandage or sling 4 of FIG. 1, or within the cast 100 of FIGS. 2 and 3, to provide a peripherally continuous confinement of the midtarsal and plantar regions of a foot, with the action of rapidly shrinking the confinement in a cyclical pattern of relatively rapid short-duration release from shrink action. More specifically, this confinement and cyclical action may be viewed as the means of providing (a) upward and spreading force at longitudinally spaced plantar regions of the sole of the foot, said regions being essentially limited by and between the ball and heel of the foot and (b) downward force at the region of the midtarsal joint. As a result of the indicated cyclical pattern, the arch is caused to flatten periodically and thus to stretch and neck down the internal sectional area of the veins of the lateral plantar complex, with resulting venous-pump action. Viewed in a still further light, this confinement and cyclical action will be seen as the means of providing vertically opposed squeezing forces between the plantar region of the sole of the foot and the region of the midtarsal joint, to thereby stimulate the venous-pump mechanism of the foot.

In all cases, it is important and deemed significant that neither the distal calf pump nor the proximal calf pump, nor any other of the significant pumps of the venous-return system of the involved leg is actuated in time-coincidence with foot-pump actuation. This fact illustratively enables the described invention to be operative within a cast, or to be operative in region remote from orthopedic fixation of a damaged tibia, knee, or femur, or to be similarly remote from the region of a vein-transplant operation and thus to relatively rapidly dissipate the pain and swelling which are the normally expected post-operative consequence of such an operation. In spite of the remoteness of foot-pump actuation from these other regions of trauma, the fact of no other pump involvements means that foot-pump driven venous return flow can be substantially unimpeded in its direct delivery to and through the region of trauma.

Figure 5:
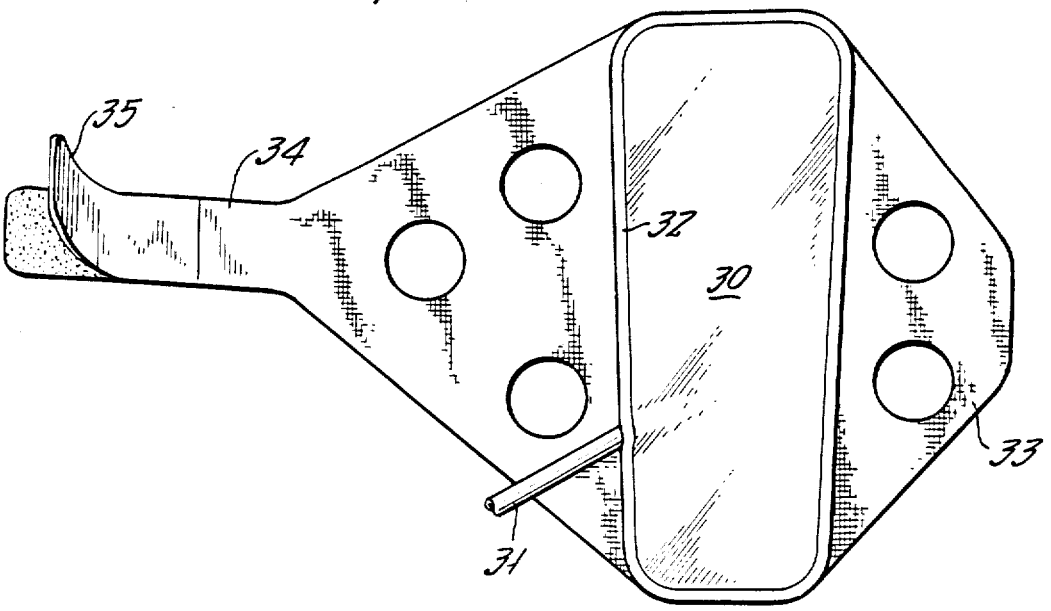
FIGS. 5 and 6 are views similar to FIG. 4, to show modifications.
Figure 6:
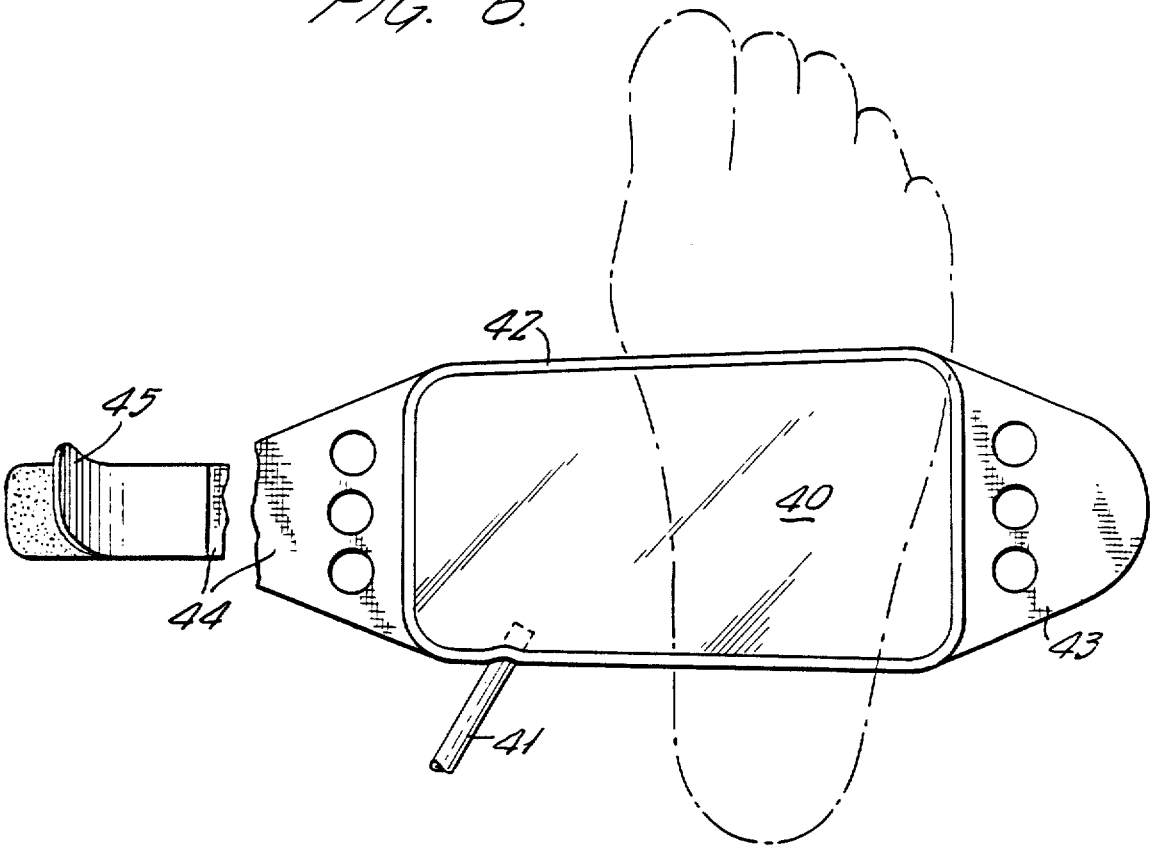

FIGS. 5 and 6 are further inflatable-bag embodiments of the invention, although they are presently of lesser preference, as compared to the embodiment of FIG. 4.

In FIG. 5, an inflatable bag 30 is longitudinally elongate and corresponds generally to the function and placement of area A of the bag 1 in FIG. 4. Bag 30 thus is designed for application to the plantar region of the sole of the foot, being cyclically inflatable via a flexible inlet pipe 31 sealed to bag 30 via locally sealed access through the peripheral seam 32 of the bag. A perforated flexible tab 33 corresponds to the tab 23 of FIG. 4, and a similar but ultimately more narrow and more extensive tab 34 is connected to the opposite longitudinal edge of bag 30, being adhesively coated and protected by peel-off material 35. A retaining hoop is circumferentially completed by pressure adhesion of tab 34 to tab 33. In a cyclical application of pressure fluid to the device of FIG. 5, it is the longitudinal flattening of the arch which is primarily responsible for foot-pump stimulation.

In the arrangement of FIG. 6, an inflatable bag 40, served by an inlet pipe 41 and peripherally sealed at seam 42 is generally rectangular but elongate in the direction transverse to the longitudinal direction of the foot (phantom outline); and end tabs 43–44 correspond to those previously described, to enable pressure-adhered completion of a circumferential hoop or belt around the midtarsal/plantar regions of the foot. In a cyclical application of pressure fluid to the device of FIG. 6, it is the generally vertical squeezing action at the midtarsal/plantar region which is primarily responsible for foot-pump stimulation, i.e., virtually without any arch-flattening action.

In certain post-operative situations wherein a part of the leg other than the foot is involved, it is therapeutically beneficial not only to operate the foot pump but also to allow the patient a degree of freedom to stand and walk on his installed footpump bag 1, or 30, or 40. In such a situation, a fitted slipper 50 is most useful, and may take any one of a variety of forms, so that FIGS. 7 and 8 will be understood to be merely illustrative of one of these forms.

Figure 7:
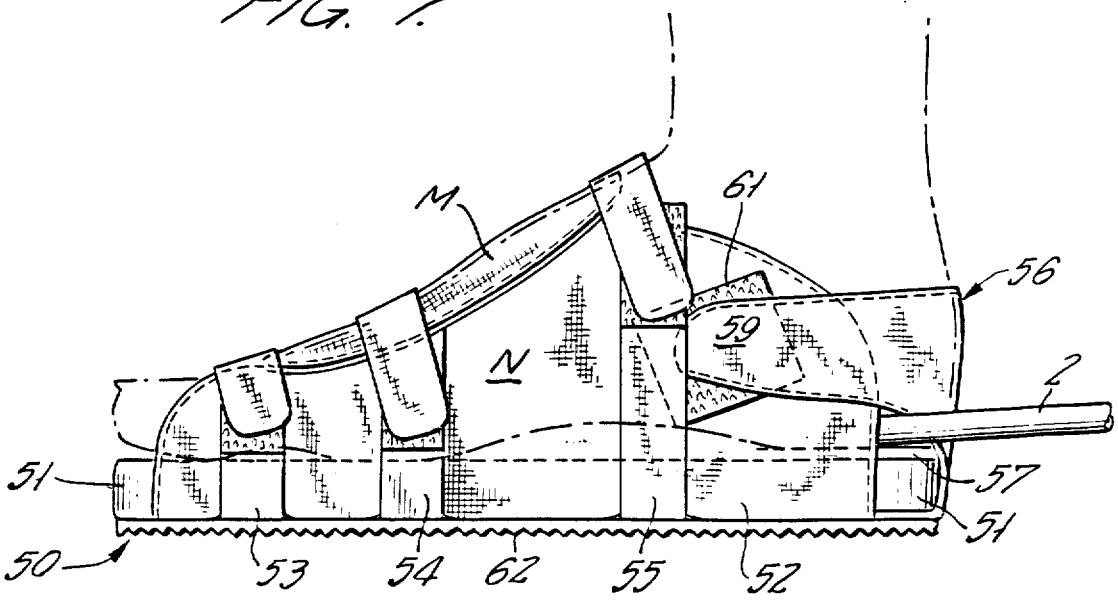
FIG. 7 is a side view in elevation of a slipper applied over a foot that has been fitted with one of the inflatable foot-pump bags of the invention.
Figure 8:
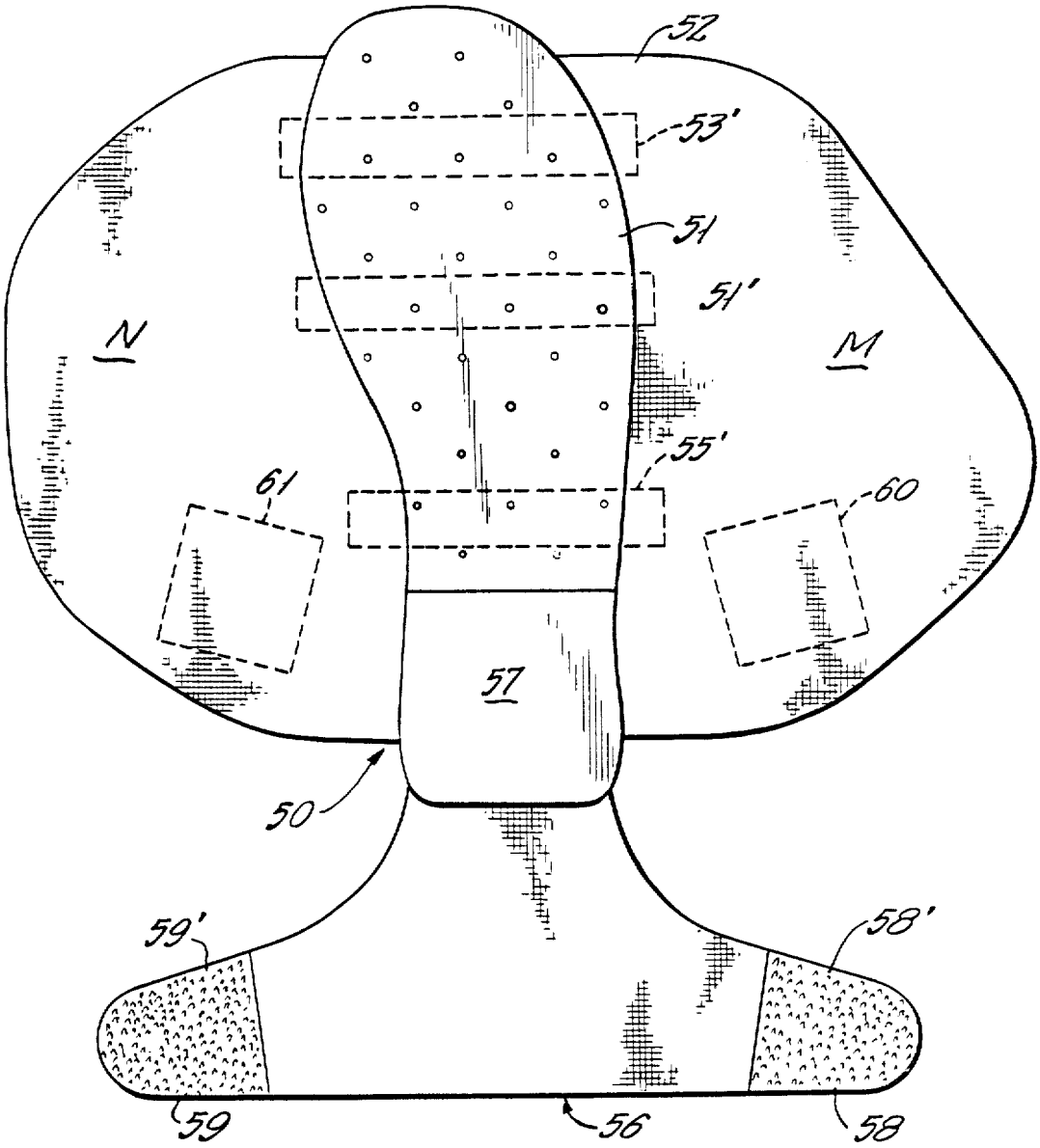
FIG. 8 is a plan view of the slipper of FIG. 7, in flattened condition, prior to use.

The slipper 50 comprises a sole member 51 of relatively rigid, porous, light-weight material, centrally adhered to a sheet 52 of light-weight duck or canvas, leaving flexible lateral flaps M–N projecting laterally beyond the respective longitudinal side edges of sole member 51; flaps M–N are adapted for wrap-around fit to the particular foot, the lap of flap M over flap N being visible in FIG. 7. Woven-fabric straps 53–54–55–56 have centrally-sewn connection to the underside of sheet 52, at regions marked 53'–54'–55'–56' in FIG. 8, leaving free ends for completion of circumferential fastening of sole member 52 to the foot at each of three longitudinally spaced locations; it is convenient to have one end of each strap fitted with a wire bail, so that the other end of each strap can be threaded through the corresponding bail and be Velcro-fastened against itself, to hold each adjusted strap connection.

A tail portion 52' of fabric sheet 52 extends rearward of a small yieldable heel step 57 at the back end of sole member 51, and tail portion 56 is characterized by like, oppositely directed tabs 58–59, each of which has an exposed patch of Velcro loop material 58'–59'. These patches are selectively engageable with patches 60–61 of Velcro hook material sewn to the underside of panels M–N, as viewed in the sense of FIG. 8. A thin panel 62 of anti-skid material is bonded to the underside of the described assembly, to complete the slipper.

In use, and after installation of an inflatable-bag (1, 30, 40) with its inlet pipe illustratively projecting upward and rearward from the inner lateral side of the ankle, the flaps M–N are first folded into overlap over the midtarsal region, and the straps 53–54–55 set to hold the overlap. Then, tail 56 is folded upward and each of the tabs 58–59 is wrapped around the back of the heel, into completion of Velcro engagements, at 58'–60 and at 59'–61, respectively. The slipper and foot-pump actuator are not in readiness to accept cyclical pressure-fluid stimulation via connection to inlet 2. It will be understood that the relatively rigid sole member 51 provides an excellent reference against which to react, upon bag inflation, for application of arch-flattening and/or midtarsal/plantar squeezing action of the nature discussed above.

As a modification of the appliances thus far shown and described, it will be understood that inflatable foot-pump bag 1 can be incorporated in an article of footwear, such as a conventional boot, to be worn by a person needing to use the appliance.

Figure 9:
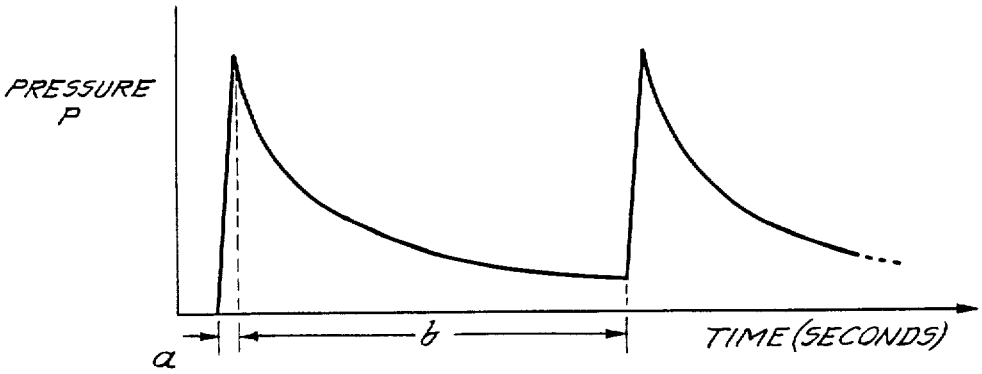
FIG. 9 is a simple graph of pressure as a function of time, in aid of discussion of use of the invention.

An inflatable bag 1 of the nature described in connection with FIG. 4 never requires a large volume change in proceeding through its inflation/deflation cycle. The maximum inflated volume is in the order of 300 to 350 cc, and on deflation the inflated volume can be expected to reduce to 100 to 120 cc. Thus, the pressure-fluid supply equipment 3 may be relatively small and convenient for tabletop or shelf mounting, with flexible-hose and disconnectable coupling to the inlet pipe 2; this is true, whether the supply and control means 3 is merely timed valving to assure programmed delivery of pressure pulses of a fluid, such as oxygen from a locally available tank supply, or the means 3 incorporates its own pumping and/or accumulator mechanism to provide the needed pressure fluid. Whatever the alternative, standard regulator, bleed orifices, time delay devices and their adjustability are all well known and therefore the supply means 3 may take on a variety of different physical embodiments. What is important, however, is that delivery of pressure fluid to inlet 2 and the bleed of fluid through pores and/or apertures and/or valving in the deflation phase shall meet certain criteria. Presently preferred criteria will be stated in the context of FIG. 9, which shows pressure P to develop quickly in the inflation phase a and to dissipate somewhat exponentially, in the deflation phase b.

Although it has been stated above the bag 1 should be inflated in two seconds or less, it is perhaps more accurate to state that in our experience to date the inflation should be as quick as possible, to imitate the normal impact of the sole of the foot on the ground when walking. Such fast inflation imparts a jerk or sharply pulsed action in return blood flow, and such action is likely to be helpful in preventing venous thrombosis. It is believed that maximum velocity, however transient upon pulsed excitation, is more important than total blood flow. The veins have check-valve formations, and the downstream side of each check valve is a site where stagnation and clotting may occur; it is believed that with bag inflation as rapid as possible, the opening phase for each check valve is correspondingly rapid, thus locally stirring stagnant return-flow blood and reducing the chances of a clotting constriction of return-flow passages.

The peak pressure P for any delivered inflation impulse should be that which is sufficient to produce the appropriate venous impulse, whilst not being too uncomfortable for the patient to tolerate. This will of course mean a different peak pressure P which will be various, depending upon the particular patient and his affliction. However, it can be said that, in our experience to date, a peak pressure within bag 1 (20, 30, or 40) of 200 to 220-mm Hg has been satisfactory, although there may be times when it is advisable to use a peak pressure somewhat greater than 220-mm Hg. Such peak pressure has produced comfortable actuation of the patient's foot pump, in the circumstances wherein the supply apparatus 3 has provided time-switched delivery of oxygen from a pressure tank and wherein the inflation time a was 0.4 second.

The total period (a+b) of the inflation/deflation cycle will also be various, depending upon the confronting pathological condition and, in particular, on the severity of venous obstruction and on how quickly the physiological venous pump becomes filled. As a rough guide, it can be said that in severe venous obstruction, as in a limb with marked swelling, the period of the cycle might be as frequent as every 10 seconds. In moderate swelling, 30 seconds would probably be adequate, whereas for maintenance purposes a 60-second cycle should suffice. The optimum frequency of the cycle can be audibly determined by the clinician, listening to the flow in the posterior tibial veins with a Doppler monitor.

Although the interval between inflation pulses is very much greater than the indicated rapid inflation time a, deflation should commence automatically at achievement of predetermined peak pressure, and initial deflation should be rapid and follow an exponential pattern. Thus, we currently recommend leakage in bag 1 to the extent that, for example, for a peak pressure P of 210-mm Hg, deflation to 30-mm Hg should be in about one second, and to 20-mm Hg in about 1.9 seconds. A timer, within apparatus 3, reinitiates the cycle upon predetermined time-out of the interval b.

Operations in which the described foot-pump actuating means are likely to be particularly useful include leg fractures and operations around the knee joint, where the leg veins may become compressed either during or after an operation. It has been found very useful in arterial and vein-graft operations, where some of the leg veins have had to be ligated and where the collateral venous-return channel (the long saphenous vein) has had to be removed for use as an arterial graft.

It will be seen that the invention as shown and described provides pneumatic apparatus whereby venous pump action is promoted in the leg of a human body, in simulation of the weight-bearing phase of ambulation, and in circumstances wherein ambulation is not possible. A circumferential tie to the foot is provided at the region of the midtarsal joint. Within this tie, the single inflatable bag 1 has an active-surface area which extends longitudinally to and between the ball and heel of the foot; and cyclically operative means are provided to inflate and deflate the bag in a recurrent cycle wherein single-pulse delivery of inflating pressure fluid is relatively rapid to thus apply upward and spreading force between the circumferential tie and the foot at longitudinally spaced plantar regions which are essentially limited by and between the ball and heel of the foot, said means being operative to then deflate the bag and thus relax said force for such period of time as is necessary for return of blood to the veins of the foot. The cyclical operation of said means establishes a pattern of force-application and ensuing force-relaxation whereby the arch of the foot is periodically caused to flatten and thus to stretch and neck down the internal sectional area of veins of the lateral plantar complex, whereby blood which accumulates during of the force-relaxation period is forcibly pumped in the venous-return system.

What is claimed is:

1. A medical appliance comprising an inflatable bag of flexible material having two like panels peripherally sealed to each other, at least one panel being of porous material or of a puncturable material, said panels each having a plantar-aspect sole area configurated to longitudinally lap essentially only the region of a foot between adjacent plantar limits of the heel and ball of the foot and to extend transversely into substantial register with lateral-edge limits of the sole of the foot, said panels integrally including within the same peripheral seal a dorsi-medial area extending transversely from one lateral edge of the sole area to a transverse extent substantially as great as the longitudinal extent of the sole area and being of width very substantially less than the longitudinal extent of the sole area, whereby with said sole area positioned in the plantar area of the foot, the dorsi-medial area may be applied over the medial inner side of the foot, and a supply-tube connection to said bag within said second area.

2. The medical applicance of claim 1, in which a first tab extends transversely outward from the dorsi-medial area of said bag and a second tab extends transversely outward from the other lateral edge of said sole area, said tabs being engageable to each other for circumferential completion of a wrapped application of the appliance around the plantar and dorsum regions of a foot.

3. The medical applicance of claim 2, in which the second tab is generally triangular, being connected continuously to and along substantially the entire length of said other lateral edge of said sole area, said second tab having front and back edges which converge toward each other in the transversely outward direction.

4. A medical appliance comprising an inflatable bag of flexible material having two like panels peripherally sealed to each other, at least one panel being of porous material or of a puncturable material, said panels each having an elongate plantar-aspect sole area configurated to longitudinally lap essentially only the region of a foot between adjacent plantar limits of the heel and ball of the foot and to extend transversely into substantially register with lateral-edge limits of the sole of the foot, a supply-tube connection to said bag near the sealed periphery thereof, and first and second tabs extending transversely outward from the respective lateral edges of said bag, said tabs being engageable to each other for circumferential completion of a wrapped application of the appliance around the plantar and dorsal regions of a foot.

5. The medical appliance of claim 4, in which said tabs are both generally triangular, one side of one triangle having continuous connection to and along substantially the entire length of one lateral edge of said sole area, the other side of the other triangle having continuous connection to and along substantially the entire length of the other lateral edge of said sole area, and each of said tabs having front and back edges which converge toward each other in the transversely outward direction.

6. A medical appliance comprising an inflatable bag of flexible material having two like panels peripherally sealed to each other, at least one panel being of porous material or of puncturable material, said panels being of generally rectangular configuration with a length dimension defined by generally opposed longer sides and with a width dimension defined by opposed shorter sides, the width dimension being in approach to but less than the span between the ball and heel of a foot, the length dimension being at least sufficient, when oriented transverse to the foot, to transversely and continuously lap the plantar and dorsi-medial regions of the foot, a supply-tube connection to said bag near the sealed periphery thereof, and first and second tabs extending outwardly from the respective shorter sides, said tabs being engageable to each other for circumferential completion of a wrapped application of the appliance around the plantar and dorsal regions of the foot.

7. A medical appliance comprising an inflatable bag shaped for active engagement solely with a human foot and substantially only in the region between the ball and the heel of the foot, and cyclically operable automatic means for delivering pressure within said bag in accordance with the following criteria:

(a) a pressure rise to a predetermined maximum of 220-mg Hg or less within less than two seconds;
(b) upon achievement of said maximum, dropping the pressure at least to one seventh of said maximum pressure within approximately one second; and
(c) repeating pressure delivery pursuant to criteria a and b at a periodic interval which is in the range of 5 to 60 seconds.

8. The appliance of claim 7, wherein the time duration for criterion a is less than one second.

9. The appliance of claim 7, wherein the time duration for criterion a is in the range 0.25 to 1.0 second.

10. The appliance of claim 7, wherein said predetermined maximum pressure is at least 200-mm Hg.

11. The appliance of claim 7, wherein the drop in pressure, upon achievement of said maximum, is to one tenth of said maximum pressure within approximately two seconds.

12. The appliance of claim 7 further including a sandal appliance for removable application to a foot wherein said inflatable bag is positioned between said sandal appliance and the plantar region between the ball and heel of the foot, said sandal appliance comprising an elongate sole member of relatively rigid material and of length to overlap both the ball and heel of the foot, first and second side panels of flexible material secured to the bottom of said sole member and extending transversely thereof to an extent permitting an overlap of said side panels to complete a circumferential wrap of the plantar and dorsal regions of the foot, adjustable-strap means for retaining circumferential integrity of the envelopment of the foot, the bag and the sole member, and a tail panel of flexible material secured to the bottom of said sole member and extending behind the heel region thereof, said tail panel being foldable upward behind the heel of the foot and including lateral wing portions foldable forwardly into detachably retained overlap with portions of the respective side panels, whereby the circumferential retention of said envelopment is preserved against forward slippage in the course of cyclically pulsed inflation of said bag.

13. The appliance of claim 12, and including an elastomeric tread panel conforming to the platform of said sole member and in retained bottom overlap with said sole member, with overlapped portions of said panels sandwiched between said sole member and said tread panel.

14. The appliance of claim 12, in which said strap means extends continuously under said sole member.

15. The appliance of claim 12, in which said strap means comprises plural straps secured to said sole member at longitudinally spaced locations.

16. The appliance of claim 12, in which said sole member extends substantially the full length of the foot.

17. The appliance of claim 12, in which the forward edge of each of said side panels is short of the front end of the foot, whereby an exposed toe permits observation of peripheral blood circulation.

18. The appliance of claim 12, in which the longitudinal extent of said side panels longitudinally laps the ball and the heel of the foot.

19. A medical appliance comprising an inflatable bag shaped for active engagement solely with a human foot and substantially only in the region between the ball and the heel of the foot, and cyclically operable automatic means for delivering pressure within said bag in accordance with the following criteria:

(a) a pressure rise to a predetermined maximum of at least 200-mm Hg within one second;
(b) upon achievement of said maximum, dropping the pressure at least to one seventh of said maximum pressure within approximately one second; and
(c) repeating pressure delivery pursuant to criteria a and b at a periodic interval which is in the range of 5 to 60 seconds.

20. A medical appliance, comprising circumferential-tie means adapted to peripherally envelop essentially only and to conform generally to the instep region of a foot and to the plantar region of the foot within the span between the ball and heel of the foot, a single inflatable bag adapted for retention within and by said circumferential-tie means, said bag having an active-surface portion longitudinally limited to said span and conformable to the sole of the foot within said span, and means to inflate and deflate said bag in a recurrent cycle wherein single-pulse delivery of inflation pressure is within two seconds, with deflation commencing at termination of single-pulse delivery, the deflation being for such period of time as is necessary for return of blood to the veins of the foot.

21. A medical appliance, comprising circumferential-tie means adapted to peripherally envelop essentially only and to conform generally to the instep region of a foot and to the plantar region of the foot within the span between the ball and heel of the foot, a single inflatable bag adapted for retention within and by said circumferential-tie means, said bag having a first active-surface portion longitudinally limited to said span and conformable to the sole of the foot within said span, said bag also having as an integral inflatable formation therewith a further portion of lesser longitudinal extend than said span and having inner lateral-aspect connection to the said first portion, and means to inflate and deflate said bag in a recurrent cycle wherein single-pulse delivery of inflating pressure fluid is within two seconds, with deflation commencing at termination of the single-pulse delivery, the deflation being for such period of time as is necessary for the return of blood to the veins of the foot.

22. An appliance as claimed in claim 21, in which said further portion extends circumferentially to the instep region of the foot.

23. An appliance as claimed in claim 20 or claim 21 or claim 22, in which the bag is substantially totally impervious to air, said means to deflate said bag comprising a valved outlet.

24. An appliance as claimed in claim 20 or claim 21 or claim 22, in which said means to deflate said bag comprises an air-permeable surface of the bag, which in use of the appliance is the surface nearest to the sole of the foot.

25. An appliance as claimed in claim 20 or claim 21 or claim 22, in which said means to deflate said bag comprises an air-permeable surface of the bag wherein said surface is formed of inherently air-permeable material.

26. An appliance as claimed in claim 20 or claim 21 or claim 22, in which said means to deflate said bag comprises an air-permeable bag surface which is formed with air-leakage orifices.

27. An appliance as claimed in claim 20 or claim 21 or claim 22, in which said means to inflate and deflate said bag is operative in a recurrent cycle wherein single-pulse delivery of inflating pressure fluid is within one second.

28. An appliance as claimed in claim 20 or claim 21 or claim 22, in which said means to inflate and deflate said bag is operative in a recurrent cycle wherein single-pulse delivery of inflating pressure fluid is within the range 0.25 to 1.0 second.

* * * * *

UNITED STATES PATENT AND TRADEMARK OFFICE

CERTIFICATE OF CORRECTION

PATENT NO. : RE 32,939 C1
DATED : July 9, 2002
INVENTOR(S) : Arthur M.N. Gardner et al.

It is certified that error appears in the above-identified patent and that said Letters Patent is hereby corrected as shown below:

Column 1,
Line 22, replace “proxial” to -- proximal --.
Line 33, replace “FGS.” with -- FIGS. --.
Line 50, replace “he” with -- the --.
Line 56, replace “flaps” with -- flaps, --.

Column 2,
Lines 8 to 9, change italic font to regular font.
Line 32, replace “dorsi-medical” with -- dorsi-medial --.
Line 55, replace “region” with -- regions --.
Line 58, replace “tab s generally” with -- tab is generally --.

Column 3,
Line 10, replace “circumferentia*lly*” with -- circumferential*ly* --.
Line 29, replace “and heel” with -- and the heel --.
Line 33, replace “200-” with -- 220- --.
Line 57, replace “critical” with -- criteria --.

Column 4,
Line 30, replace “thefoot” with -- the foot --.

Signed and Sealed this

Fifteenth Day of April, 2003

JAMES E. ROGAN
*Director of the United States Patent and Trademark Office*